United States Patent
Nöth et al.

(10) Patent No.: US 11,585,718 B2
(45) Date of Patent: Feb. 21, 2023

(54) METHOD AND DEVICE FOR IMBALANCE DETECTION

(71) Applicant: ebm-papst Mulfingen GmbH & Co. KG, Mulfingen (DE)

(72) Inventors: Frederik Nöth, Würzburg (DE); Pattrick Peppel, Bad Mergentheim (DE); Ralph Wystup, Künzelsau (DE); Robert Druschel, Künzelsau (DE); Michael Hopf, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 188 days.

(21) Appl. No.: 15/951,264

(22) Filed: Apr. 12, 2018

(65) Prior Publication Data

US 2018/0299341 A1  Oct. 18, 2018

(30) Foreign Application Priority Data

Apr. 13, 2017 (DE) .......................... 102017108109.7

(51) Int. Cl.
- *G01M 1/28* (2006.01)
- *G01M 1/22* (2006.01)
- *G01P 15/097* (2006.01)

(52) U.S. Cl.
CPC ................ *G01M 1/28* (2013.01); *G01M 1/22* (2013.01); *G01P 15/097* (2013.01)

(58) Field of Classification Search
CPC ............ G01M 1/14; G01M 1/16; G01M 1/22; G01M 1/28; G01P 15/097
See application file for complete search history.

(56) References Cited

U.S. PATENT DOCUMENTS

| | | | |
|---|---|---|---|
| 5,659,136 A | * | 8/1997 | Koch ...................... B04B 9/146 73/462 |
| 6,353,384 B1 | | 3/2002 | Kramer |

(Continued)

FOREIGN PATENT DOCUMENTS

| | | |
|---|---|---|
| DE | 39 37 403 | 5/1991 |
| DE | 10 213 205 353 | 10/2014 |

(Continued)

OTHER PUBLICATIONS

European Search Report dated Sep. 10, 2018 in corresponding European Serial No. 18 165 82.2.

(Continued)

*Primary Examiner* — Herbert K Roberts
*Assistant Examiner* — Anthony W Megna Fuentes
(74) *Attorney, Agent, or Firm* — Harness, Dickey & Pierce, P.L.C.

(57) ABSTRACT

A device (10) and method for sensor diagnostic monitoring and detection of an imbalance of a rotating machine (1) has steps of (a) detecting acceleration signals (Sb) of the housing (2) or of a non-rotating component of the rotating machine (1) by a sensor (20); (b) detecting signals (Sd) for the determination of the rotation speed of the rotating machine (1) by a second sensor; and (c) supplying and evaluating of sensor signals (Sb, Sd) by an evaluation unit (40, 50, 60). An acceleration component that is acquired occurs with the rotation speed of the rotating machine. This component is compared with a predetermined limit value.

9 Claims, 2 Drawing Sheets

(56) References Cited

U.S. PATENT DOCUMENTS

| | | | |
|---|---|---|---|
| 2008/0272765 A1* | 11/2008 | Song | G01P 3/48 |
| | | | 324/173 |
| 2009/0139327 A1 | 6/2009 | Dagh et al. | |
| 2015/0284895 A1* | 10/2015 | Davis | G01M 99/005 |
| | | | 68/131 |
| 2015/0369687 A1 | 12/2015 | Furman et al. | |

FOREIGN PATENT DOCUMENTS

| | | |
|---|---|---|
| DE | 10 2014 116 527 A1 | 5/2016 |
| DE | 10 2015 102 476 A1 | 8/2016 |
| EP | 0 770 860 A2 | 5/1997 |

OTHER PUBLICATIONS

Components of Acceleration, East Tennessee University; https://math.etsu.edu/multicalc/prealpha/Chap 1-8/printversion.pdf.

* cited by examiner

METHOD AND DEVICE FOR IMBALANCE DETECTION

CROSS-REFERENCE TO RELATED APPLICATION

This application claims priority to German Application No. 102017108109.7, filed Apr. 13, 2017. The disclosures of the above application is incorporating herein by reference.

FIELD

The disclosure relates to a method and device for carrying out sensor diagnostic monitoring and detection of an imbalance of a rotating machine.

BACKGROUND

Various methods are known in the prior art for diagnosing manufacturing machines or production systems and their temporal behaviour. The system availability of a rotating machine such as a motor, for example, represents an important factor for the economic use of this device.

The main aim of a method for monitoring the state of, in particular, rotating or rotatable machines consists in enabling, to the extent possible without interruption of the operation, an evaluation of the current machine state, of the loading of the machine and of any changes in the machine state regarding its true-running. Here, the meaning of machine state is understood to include the evaluation of the imbalance of the machine based on certain operating parameters.

In rotating operating machines, a circulating radial force component can occur due to irregular mass distribution. This leads to vibrations and increased wear of the machine. Therefore, it would be desirable to be able to detect the irregular mass distribution (imbalance) of the rotating component. The imbalance changes depending on the duration of operation.

By means of preventive maintenance and empirical values, the availabilities of the rotating devices can be improved. At the same time, the downtime of the rotating installations as well as maintenance costs can be reduced. Here, it is disadvantageous that it is rarely possible to make precise predictions concerning the current state and the true-running of the machine, which is rotating at a given time. It is therefore not possible to make predictions or obtain findings on the time of breakdown of machine parts, bearings or wearing parts. Furthermore, preventive maintenance is not an appropriate means to detect the imbalance but is instead used only to prevent machine downtime. Indeed, it is therefore repeatedly the case that parts that still have a long remaining useful life are replaced, and as the case may be, still no imbalance exists.

An alternative form consists of a state-based and regular detection of the machine state. The measurement and evaluation methods that have been developed for this purpose and, that are available in the prior art, are used to monitor and evaluate process parameters and machine characteristics such as, for example, temperature, pressure, torque or electrical current data. Frequently, a vibration analysis is also used for machine diagnosis. By such an analysis it is already possible in the early stage to detect and diagnose a malfunction. It is detectable due to increasing imbalance in order to prevent resulting damage and downtime.

Thus, for example, methods are known for monitoring continuously moving and/or rotating machine parts, in particular machine bearings, by analysing vibration patterns. The vibration monitoring systems necessary for this purpose measure the vibration of the rotating machine over a prolonged time period and issue, for example, an immediate error message if a the total vibration level has exceeded a limit value.

In such methods, it is disadvantageous that a detection occurs only when limit value parameters have actually been exceeded. Further, it is also difficult to guess the origin of the changed vibration behaviour. Often it is only with difficulty that the presumed cause of an error message can be connected with the actual cause.

Such simple parameters of the vibration signal accordingly do not allow a reliable assessment of the "imbalance" of rotating machines and much less a prediction. In complex machines, where each case associates several rotating components and drives next to one another, a targeted monitoring is hardly possible.

Alternatively, in the prior art, the imbalance is usually detected by the detection of changes in rotation speed, changes in the motor currents or by acceleration sensors. The evaluation of rotation speed and motor current is direction-dependent and is usually used with an alignment of the apparatus with the shaft in a horizontal direction, since, as a result, due to gravity, a lifting effect is generated. Acceleration sensors are not bound to certain directions, but give information on all the acting accelerations, including accelerations that are not connected with the rotation of the machine, such as external influences, for example.

SUMMARY

Based on the prior art, the aim of the present disclosure is to overcome the above-mentioned disadvantages. The disclosure proposes a device and a method for simple and reliable monitoring and detection of the imbalance of a rotating machine.

A device and method for sensor diagnostic monitoring and detection of an imbalance of a rotating machine has steps of (a) detecting acceleration signals (Sb) of the housing or of a non-rotating component of the rotating machine by a sensor; (b) detecting signals (Sd) for the determination of the rotation speed of the rotating machine by a second sensor; and (c) supplying and evaluating the sensor signals (Sb, Sd) by an evaluation unit. An acquired acceleration component occurs with the rotation speed of the rotating machine. This component is compared with a predetermined limit value.

A rotating machine in a stationary housing comprises a device for monitoring and detecting an imbalance (U) of the rotating machine. The device includes a first sensor and a second sensor. The first sensor is arranged in the housing of the rotating machine to detect acceleration signals (Sb) of the housing. The second sensor simultaneously detects signals (Sd) for the determination of the rotation speed of the rotating machine. A microcontroller receives the sensor signals (Sb, Sd). The microcontroller evaluates the correlation of the two signals (Sb, Sd) to acquire an acceleration component due to the imbalance that circulates with the determined rotation speed.

In a method according to the disclosure, in particular for sensor diagnostic monitoring of a rotating machine, it becomes possible to automatically detect, during running operation, state information on the imbalance of the rotating machine, in particular, on a dynamic imbalance (also referred to as couple imbalance). It detects the state where the rotation axis no longer coincides with one of the stable principal axes of inertia of the rotating component.

The basic idea of the disclosure is to achieve the detection of an irregular mass distribution on the rotating body by parallel, i.e., simultaneous, acquisition and evaluation of rotation speed of the rotating body and acceleration on the non-rotating body. The signals necessary for this purpose are supplied by an acceleration sensor in the housing or on the non-rotating component and by a Hall sensor positioned, preferably directly, on the stator of the rotating machine. Due to the involvement of the rotation speed of the rotating machine, the evaluation can be limited to rotation-caused vibrations and the external influences can be blocked out.

In the disclosure, use is made of the finding that an irregular mass distribution on the rotating body leads to an acceleration component circulating with the rotation speed in a direction orthogonal to the rotation axis.

For this purpose, according to the disclosure, by means of an acceleration sensor, a corresponding signal is recorded. The components of the acceleration signal, that are triggered by the rotation speed-caused excitation of the apparatus, are filtered out.

At the same time, the current rotation frequency of the rotating machine is detected by the Hall sensor. As a function of the detected rotation frequency, the signal of the acceleration sensor is bandpass filtered. From the filtered signal, the axial acceleration amplitudes perpendicular to the rotation axis are calculated. A smoothed average is formed. The calculated values are compared with reference values stored in the system, and, if the limit value is exceeded, a corresponding signal is generated.

Therefore, according to the disclosure, a method for sensor diagnostic monitoring and detection of an imbalance of a rotating machine has the following steps:

(a) detecting acceleration signals of the housing or of a non-rotating component of the rotating machine by a (first) sensor;

(b) detecting signals for the determination of the rotation speed of the rotating machine by a (second) sensor;

(c) supplying and evaluating sensor signals by an evaluation unit.

An acceleration component is acquired that occurs with the rotation speed of the rotating machine and is preferably orthogonal to the rotation axis. This component is compared with a predetermined limit value.

Preferably, for this purpose, a single microcontroller is provided. The signals of the rotation speed sensor and the signals of the acceleration sensor are supplied to the microcontroller. The microcontroller carries out the calculation and the analysis of the signals and their rotation speed-dependent correlation.

An additional aspect of the present disclosure relates to a device for monitoring and detecting an imbalance of a rotating machine. The device includes a first sensor to detect the accelerations. In particular, it detects the acceleration component in a radial direction caused by the imbalance. A second sensor simultaneously detects the rotation speed. A microcontroller evaluates the correlation of the two signals. The microcontroller acquires the radial acceleration component due to the imbalance that circulates with the detected rotation speed.

Additional advantageous developments of the disclosure are characterised in the dependent claims or represented in greater detail below together with the description of the preferred design in reference to the figures.

DRAWINGS

The drawings described herein are for illustrative purposes only of selected embodiments and not all possible implementations, and are not intended to limit the scope of the present disclosure.

DETAILED DESCRIPTION

Figure 1:
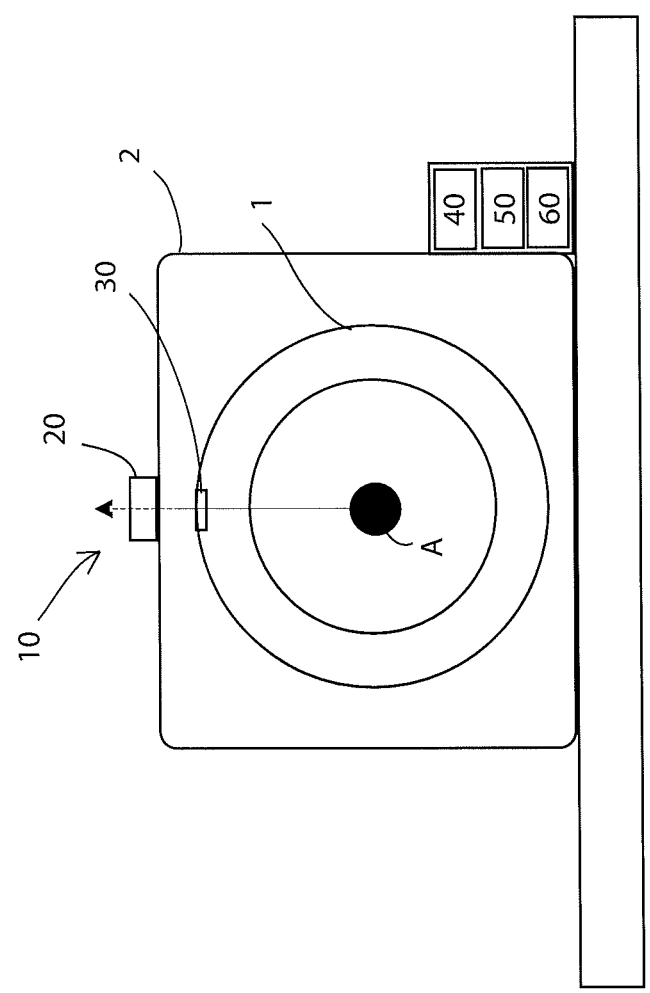
FIG. 1 is a diagrammatic representation of a rotating machine with a device according to the disclosure.

Below, the disclosure is explained in further detail with reference to FIGS. 1 and 2. Identical reference numerals refer to identical structural and/or functional features.

In FIG. 1, a diagrammatic representation of a rotating machine 1 with a device 10 according to the disclosure is shown. The rotating machine 1 is designed in a stationary housing 2. A device 10 for monitoring and detecting an imbalance "U" of the rotating machine 1, by a first sensor 20, is arranged in the housing 2. In this particular case, the sensor 20 is an acceleration sensor. It is used to detect the acceleration signals Sb. The acceleration sensor 20 is attached on the stationary portion of the housing 2. The imbalance acceleration is periodically transferred, namely, in this particular case, to the housing 2.

The acceleration signals Sb contain the acceleration components significant for an imbalance. The signals 5b periodically repeat with the rotation speed of the rotating machine.

In order to simultaneously detect signals Sd, for the determination of the rotation speed of the rotating machine, a second sensor (30) is provided. The second sensor 30 is a Hall sensor and is mounted on the stator.

In addition, the device is designed with a microcontroller 40. The microcontroller 40 can be seen in the block diagram of FIG. 2. The microcontroller 40 processes the sensor signals Sb, Sd. The microcontroller is designed to evaluate the correlation of the two signals Sb, Sd and, in particular, to acquire the acceleration component in a radial direction due to the imbalance that circulates with the determined rotation speed.

Thus, according to this embodiment, an evaluation of the acceleration can be carried out that is limited to the $1^{st}$ order excitation (circulating radial force component caused by rotation of the rotating body). The calculation effort of the microcontroller is correspondingly reduced. Furthermore, interfering influences caused by external excitation are blocked out. Thus, if a predetermined threshold value, with a radial acceleration component is exceeded, an imbalance is detected.

Figure 2:
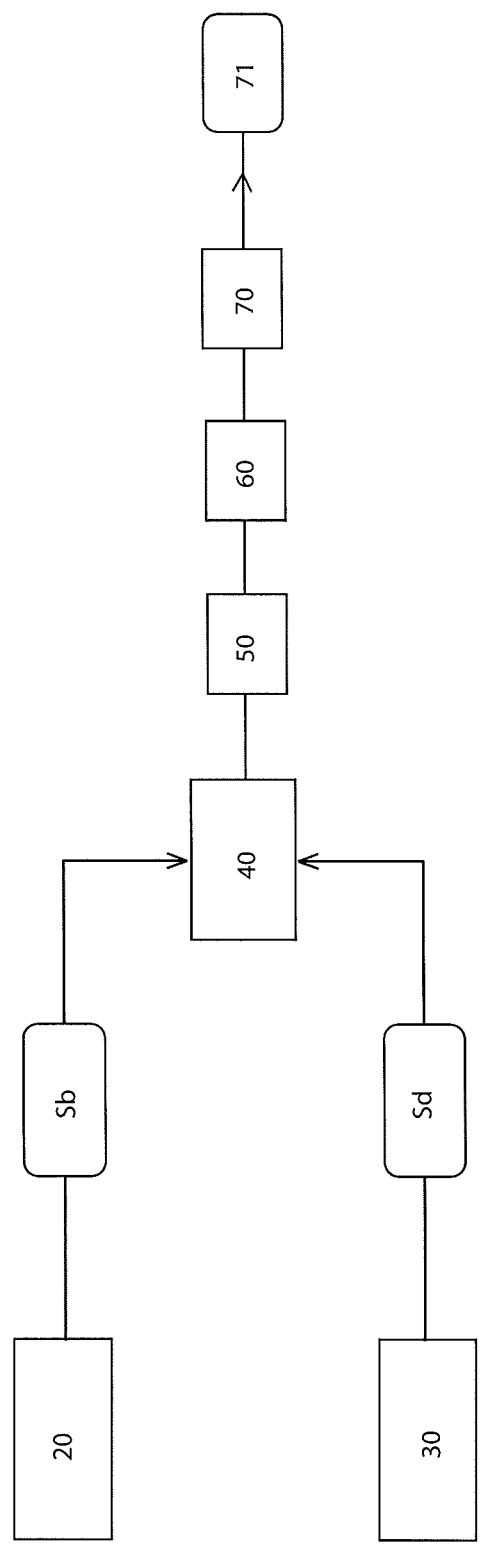
FIG. 2 is a diagrammatic representation of the method according to the disclosure with the aid of a block diagram.

As represented in the embodiment example in FIGS. 1 and 2, a signal conditioning unit 50 and a signal processing unit 60 are used for the signal processing of the signals Sb, Sd obtained and processed by the microcontroller 40. The result is supplied to an output unit 70 and/or an interface 71.

Thus, as shown in the block diagram of FIG. 2, as an example, the following method is used to detect an imbalance in a simple and reliable manner. For this purpose, the following steps are:

detecting acceleration signals Sb by the acceleration sensor 20 on the housing 2;

detecting signals Sd by the Hall sensor 30 for the determination of the rotation speed of the rotating machine 1;

supplying and evaluating the sensor signals Sb, Sd by an evaluation unit including a microcontroller 40, signal conditioning unit 50 and a signal processing unit 60. A radial (in particular periodically occurring) acceleration component with the rotation speed of the rotating machine 1 is acquired. This component is compared with a predetermined limit value.

In the last step, for the evaluation of the imbalance, the smoothed average of the orthogonal components and/or amplitudes of the acceleration signal Sb is determined. The signal is bandpass filtered by a signal conditioning and/or signal processing unit 50, 60 for the detection of the orthogonal components and/or amplitudes of the acceleration signal Sb.

The disclosure is not limited in its embodiments to the aforementioned preferred exemplary embodiments. Rather, it includes a number of variants, that make use of the solution presented here even in substantially different embodiments. For example, various materials could be provided for the plug housing, although it preferably is made of injection-molded plastic.

What is claimed is:

1. A rotating machine in a stationary housing comprising:
    a device for monitoring and detecting an imbalance (U) of the rotating machine, the device includes a first sensor and a second sensor, the first sensor is an acceleration sensor arranged directly on the housing of the rotating machine to detect acceleration signals (Sb) of the housing, the second sensor, arranged on stator, simultaneously detects signals (Sd) for the determination of the rotation speed of a rotating body of the rotating machine; and
    a microcontroller configured to receive the sensor signals (Sb, Sd), the microcontroller configured to:
    evaluate the correlation of the two signals Sb, Sd and, in particular, to acquire the acceleration component in a radial direction due to the imbalance that circulates with the determined rotation speed; and
    evaluate the acceleration limited to the $1^{st}$ order excitation, circulating radial force component caused by rotation of the rotating body, and interfering influences caused by external excitation are blocked out by the microcontroller, and if a predetermined threshold value, with a radial acceleration component is exceeded, an imbalance is detected by:
        determining a smoothed average of the orthogonal components of the acceleration signal; and
        detecting imbalance based on the smoothed average of the orthogonal components of the acceleration signal.

2. The rotating machine according to claim 1, wherein the second sensor is a Hall sensor.

3. The rotating machine according to claim 1, further comprising a signal conditioning unit configured for signal conditioning of the signals evaluated by the microcontroller.

4. The rotating machine according to claim 3, further comprising a signal processing unit configured for signal processing of the signals conditioned by the microcontroller or by a signal conditioning unit.

5. A method for the sensor diagnostic monitoring and detection of an imbalance of a rotating machine in a stationary housing comprising the steps of:
    (a) detecting acceleration signals (Sb) of the housing by a first sensor arranged directly on the housing;
    (b) detecting signals (Sd) for the determination of a rotation speed of a rotating body of the rotating machine by a second sensor arranged on a stator;
    (c) supplying and evaluating the sensor signals (Sb, Sd) by an evaluation unit that evaluates the correlation of the two signals Sb, Sd and, in particular, to acquire the acceleration component in a radial direction due to the imbalance that circulates with the determined rotation speed; and
    (d) evaluating the acceleration limited to the $1^{st}$ order excitation, circulating radial force component caused by rotation of the rotating body, and interfering influences caused by external excitation are blocked out by a microcontroller, and if a predetermined threshold value, with a radial acceleration component is exceeded, an imbalance is detected by:
        determining a smoothed average of the orthogonal components of the acceleration signal; and
        detecting imbalance based on the smoothed average of the orthogonal components of the acceleration signal.

6. The method according to claim 5, wherein the first sensor is an acceleration sensor and/or the second sensor is a Hall sensor.

7. The method according to claim 5, wherein, as a function of the determined rotation speed, components orthogonal with respect to a rotation axis (A) of the rotating machine and/or amplitudes of the acceleration signal (Sb) are determined.

8. The method according to claim 7, wherein, for the evaluation of the imbalance, an average of the orthogonal components and/or amplitudes of the acceleration signal (Sb) is determined.

9. The method according to claim 7, wherein, before the determination of the orthogonal components and/or amplitudes of the acceleration signal (Sb), the signal is at least bandpass filtered by a signal conditioning and/or signal processing unit.

* * * * *